N. C. DURAND.
DICTATION MEMORANDUM SHEET.
APPLICATION FILED JUNE 28, 1907.

1,033,999.

Patented July 30, 1912.

UNITED STATES PATENT OFFICE.

NELSON C. DURAND, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

DICTATION MEMORANDUM-SHEET.

1,033,999.

Specification of Letters Patent. Patented July 30, 1912.

Application filed June 28, 1907. Serial No. 381,257.

*To all whom it may concern:*

Be it known that I, NELSON C. DURAND, a citizen of the United States, residing at East Orange, Essex county, State of New Jersey, have invented a certain new and useful Dictation Memorandum-Sheet, of which the following is a description.

My invention relates to memorandum sheets adapted for use in connection with commercial talking machines of the type wherein the position of the recorder or reproducer with respect to the blank or record is indicated by means of a scale and pointer, (see patent to Weber and Hibbard, No. 772,485, dated October 18, 1904) and my object is to provide a memorandum sheet by which convenient and comprehensible instructions may be given to the transcriber as to the condition of the dictated work. Such sheets are conveniently made up into pads which are furnished to the person who dictates to the machine in order that he may from time to time make memoranda thereon of such information as he desires to communicate to the person who is to transcribe the recorded matter. This sheet accompanies the talking machine record and supplements the recorded matter thereon, and it may conveniently be rolled up and placed in the bore of the record which is preferably in the form of a hollow cylinder. These sheets save a great deal of time, as without them it is necessary for the person who is to transcribe the recorded matter to listen to a preliminary reproduction of the entire record before any attempt is made to transcribe the same, since when corrections are made they follow the matter corrected and unless the transcriber knows in advance that the changes are to be made the matter which was incorrectly dictated will have been transcribed before the correction is reached.

A memorandum sheet made in accordance with my invention comprises a representation of the scale of the talking machine, suitably designated spaces for the entry of data relative thereto, blank spaces and a number of stock phrases both of the latter being placed at that side of the talking machine scale whereon its sub-divisions appear.

The accompanying drawing, forming a part of this specification illustrates a memorandum sheet which embodies one form of my invention.

The sheet 1 is of any suitable size, proportions and character, either of cardboard or paper, and carries the representation 2 of the scale on the talking machine, though not necessarily of the same dimensions. The sheet may also contain printed matter indicating its nature and use and the like, but this printed matter is not important and may be widely varied.

The sheet which is illustrated in the drawing has the identifying spaces placed above the representation of the scale and the blank spaces for the reception of memoranda and the stock phrases below the scale. This arrangement may, of course, be varied, it being important only that the blank spaces for the reception of memoranda of various sorts and the stock phrases which are permanently imprinted upon the sheet be placed at that side of the representation of the scale nearest the base line of the latter, so that the memoranda jotted down in the blank spaces, or the particular stock phrase which is used in place of a written memorandum, may readily be connected by a straight line to the desired point of sub-division on the scale and the connecting lines readily followed by the eye.

The data identifying the record for which special provision is made on the sheet as shown in the drawing, are the date, the number of the record, the person who dictated what is recorded upon the record and the person by whom the same is transcribed. It is apparent of course, that suitably designated spaces may be provided for whatever data are necessary to fully identify the recorded matter. The stock phrases which are shown on the drawing are "Rush," "Additions," "Telegram," "Listen for corrections," "Cancel," "Extra carbons." These phrases may, of course, be varied or replaced by others, as is found most convenient. When one of these phrases is connected by a line to any particular point of subdivision on the scale, (as for example in the drawing, the "Listen for corrections" phrase is connected to the point of sub-division 25,) the operator, before transcribing the matter recorded upon that part of the record, will have the matter in that neighborhood reproduced through until the correction has been found, preliminary to a second reproduction at which time it will be transcribed as corrected, and similarly if the transcriber receives the record on which the phrase "Telegram" is connected to a particular point on the scale, the record will be placed in the talking machine and the pointer of the machine set at that point on the scale and the telegram or other rush matter transcribed immediately, and afterward the matter which is not so pressing may be taken up. If it is desired by the person dictating to call the attention of the person transcribing to something which would not properly be indicated by connecting any of the stock phrases to the scale, such memorandum may be jotted down in the space between the representation of the scale and the stock phrases, and connected with the proper point on the scale, as for example in the sheet illustrated in the drawing the person transcribing is directed to use legal cap paper on which to transcribe the matter between marks 10 and 20 on the scale.

By providing a sheet with the scale thereon, as has been explained, the operator has a much better and more vivid impression as to what is recorded upon the record to be transcribed than could be conveyed by a spoken or written instruction, while at the same time the convenience of the person dictating is greatly increased.

Actual experience has demonstrated that by the use of my improved memorandum sheet the operation of commercial talking machines, both in dictation and in transcription, will be materially facilitated.

I claim:

1. A dictation memorandum for talking machines comprising a sheet carrying a representation of the scale of a talking machine, printed stock phrases on the side of said scale nearest its base line, said phrases being arranged in a line substantially parallel to said base line and setting forth instructions to be followed in transcribing a talking machine record, and a blank space between said stock phrases and said scale, whereby said phrases may be readily connected by straight lines to any desired points on the said scale, and said lines may be readily followed by the eye, substantially as described.

2. A dictation memorandum for talking machines comprising a sheet carrying a representation of the scale of a talking machine, and printed stock phrases setting forth instructions to be followed in transcribing a talking machine record, said phrases being arranged in a line at a substantial distance from said base line whereby said phrases may be readily connected by straight lines to any desired points on said scale and said lines may be readily followed by the eye, substantially as described.

This specification signed and witnessed this 27 day of June 1907.

NELSON C. DURAND.

Witnesses:
FRANK D. LEWIS,
CHARLES F. ROBSON.

Copies of this patent may be obtained for five cents each, by addressing the "Commissioner of Patents, Washington, D. C."